(12) United States Patent
Kostic et al.

(10) Patent No.: US 7,998,309 B2
(45) Date of Patent: *Aug. 16, 2011

(54) ONE-STEP METHOD FOR THE PRODUCTION OF NANOFLUIDS

(75) Inventors: Milivoje Kostic, Sycamore, IL (US);
Mihajlo Golubovic, Chicago, IL (US);
John Hull, Downers Grove, IL (US);
Stephen U. S. Choi, Naperville, IL (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/729,494

(22) Filed: Mar. 23, 2010
(Under 37 CFR 1.47)

(65) Prior Publication Data
US 2010/0171068 A1 Jul. 8, 2010

Related U.S. Application Data

(62) Division of application No. 11/456,944, filed on Jul. 12, 2006, now Pat. No. 7,718,033.

(60) Provisional application No. 60/689,303, filed on Jul. 12, 2005.

(51) Int. Cl.
*B01D 1/22* (2006.01)
*C09K 5/00* (2006.01)

(52) U.S. Cl. .......... 159/49; 159/11.2; 159/12; 159/13.2; 159/44; 159/DIG. 16; 977/700; 977/773; 977/840; 977/900

(58) Field of Classification Search .................. 159/11.1, 159/11.2, 12, 13.2, 44, 49, DIG. 16, DIG. 23; 203/1, 89, 91, 100; 977/700, 773, 833, 840, 977/900, 902; 75/380
See application file for complete search history.

(56) References Cited

U.S. PATENT DOCUMENTS

| | | | | |
|---|---|---|---|---|
| 3,464,478 | A * | 9/1969 | Ueda et al. | 159/6.3 |
| 4,013,539 | A * | 3/1977 | Kuehnle | 204/298.24 |
| 4,090,916 | A * | 5/1978 | Papafingos et al. | 159/9.2 |
| 5,409,576 | A * | 4/1995 | Tleimat | 202/174 |
| 5,534,113 | A * | 7/1996 | Quigley et al. | 159/49 |
| 6,221,275 | B1 * | 4/2001 | Choi et al. | 252/74 |
| 6,774,036 | B2 * | 8/2004 | Goldstein | 438/660 |
| 7,470,650 | B2 * | 12/2008 | Zhang et al. | 508/113 |
| 7,744,786 | B2 * | 6/2010 | Adiga | 264/14 |
| 2008/0009434 | A1 * | 1/2008 | Reches et al. | 514/2 |

* cited by examiner

*Primary Examiner* — Virginia Manoharan
(74) *Attorney, Agent, or Firm* — Brian J. Lally; Mark C. Lang; John T. Lucas (57) ABSTRACT

A one step method and system for producing nanofluids by a nanoparticle-source evaporation and deposition of the evaporant into a base fluid. The base fluid such oil or ethylene glycol is placed in a rotating cylindrical drum having an adjustable heater-boat-evaporator and heat exchanger-cooler apparatus. As the drum rotates, a thin liquid layer is formed on the inside surface of the drum. An insulated heater-boat-evaporator having an evaporant material (nanoparticle-source) placed within its boat evaporator is adjustably positioned near a portion of the rotating thin liquid layer, the evaporant material being heated thereby evaporating a portion of the evaporant material and forming nanoparticles, the nanoparticles absorbed by the liquid film to form nanofluid.

17 Claims, 10 Drawing Sheets

ONE-STEP METHOD FOR THE PRODUCTION OF NANOFLUIDS

RELATION TO PRIOR PATENT APPLICATIONS

This application claims priority to, and is a divisional patent application of U.S. patent application Ser. No. 11/456,944, filed on Jul. 12, 2006, now U.S. Pat. No. 7,718,033 which is related to, and claims priority of, U.S. Provisional Patent Application No. 60/689,303 filed on Jul. 12, 2005, by instant inventors, all of which are hereby incorporated by reference in their entireties.

STATEMENT OF GOVERNMENTAL SUPPORT

The United States Government has certain rights in this invention pursuant to Contract No. W-31-109-ENG-38 between the U.S. Department of Energy and the University of Chicago operating Argonne National Laboratory.

FIELD OF INVENTION

The invention relates to a method and system for the manufacture of nanofluids. More particularly the invention relates to an improved one-step method and system for the manufacture of nanofluids.

BACKGROUND OF THE INVENTION

Nanotechnology is a rapidly developing science that is leading to numerous useful applications in a variety of fields. A primary limitation in further applications of nanotechnology is the ability to efficiently and rapidly produce optimal size and quality of nanoparticles in the desired mediums for use, especially in relation to nanofluids, which are suspensions of nanometer-sized particles in a base fluid. It is very tedious and difficult to manufacture adequate quantities and qualities of nanofluids for the high demand which has developed.

Nanofluids have the potential to impact a myriad of industries and technologies including the area of advanced thermally conductive fluids. For example, when nanoparticles having high thermal conductivities are added to a base fluid the resulting nanofluid often has significantly higher thermal conductivities than that of the base fluid. For example, the heat-transfer capability of ethylene glycol increased by 40% when only 0.3 percent of 10 nanometer size of pure copper nanoparticles were suspended in it. Nanofluids have great potential as heat transfer fluids in many practical applications, such as different thermal systems, electronics, nuclear and biomedical instrumentation and equipment, transportation and industrial cooling, and general thermal management (heating and cooling).

Nanofluids are currently produced by two methods. One method, known as the two-step method, involves first producing the nanoparticles, either pure metals or typically metal oxides, which are then dispersed into the base fluid. In practice this approach has not worked well, particularly for metallic particles, since they tend to oxidize and agglomerate.

The second known method is a one-step preparation process in which nanocrystalline particles ("nanoparticles") are produced by direct evaporation and deposition onto a low vapor pressure liquid. Nanoparticles produced by this one-step method have tremendous potential. See, U.S. Pat. No. 6,221,275 issued to Choi et al. on Apr. 24, 2001, which is hereby by incorporated by reference in its entirety. However, the current one-step method is a short batch process with limited control over a number of important parameters including those that determine nanoparticle size within the formed nanofluid. Therefore, state of the art systems can only produce nanofluids with nanoparticles equal to or greater than about 10-20 nm. There is a need in the art to produce nanofluids incorporating nanoparticles less than 10 nm.

One parameter that determines the size of the nanoparticles within the nanofluid is the chamber (system) pressure of the system. The chamber pressure is principally determined by the saturation vapor pressure of the base liquid in the vacuum chamber. As the liquid is heated, the chamber vapor pressure rises, and thus, it is critical to keep the liquid temperature low and as constant as possible throughout the process. Without sufficient cooling of the fluid, the temperature will rise mostly due to radiation heat input from the heater, as well as heat input from the impinging nanoparticles and heat gain from the surroundings. An increase in the temperature of the fluid can lead to evaporation of the fluid and other negative results. Therefore, controlling the temperature of the fluid and pressure within the system are very important.

Another important factor in determining the size of the nanoparticles within the nanofluid is the distance the evaporated nanoparticles need to travel before being absorbed by the fluid. Generally, the smaller the distance, the smaller number of gaseous atoms, molecules and particle collisions, and the smaller size of the nanoparticles (all other factors being equal).

For these reasons, it is difficult to make larger quantities of nanofluids or a nanofluid with a large concentration of desired size nanoparticles using current state of the art methods. Also because of the complex nature of the process, it is difficult to control nanoparticle size, the latter being very important.

SUMMARY OF THE INVENTION

In one embodiment of the invention, an improved one-step process and system for manufacture or production of nanofluids includes placing a base fluid, such as ethylene glycol or oil, in a rotating cylindrical drum situated in a vacuum chamber, part of the fluid forming a liquid pool in the bottom part of the drum.

The rotating axis of the drum is preferably horizontal, as a motor rotates the drum at a designated rotational speed. As the drum rotates, it wets and drags liquid filled in the bottom part of the drum along its inside cylindrical surface. At a proper speed a portion of the liquid forms a stream (liquid film) that is transported around the circumference of the inner surface of the drum.

A heater-boat-evaporator (HBE) is positioned in close proximity to the upper inside surface of the cylindrical drum covered by the thin liquid film. The nanoparticle-source, like a metal, evaporates at a given rate and the gaseous atoms and molecules rise away and upwards and forming nanoparticles that deposit onto the liquid film on the surface of the revolving drum forming a nanofluid. The liquid film (now a nanofluid) is further dragged with the drum and mixed with the liquid pool at the bottom of the drum. The liquid is then cooled by a heat exchanger-cooler (HXC) positioned within the liquid pool. In a steady-state process, the cooling capacity of the heat exchanger balances the heat input from the HBE and heat gains from the surroundings. The liquid is subsequently dragged back over the HBE where the cycle is repeated until desired nanoparticle concentration is achieved.

In a preferred form of the invention, the method and system includes: positioning the HBE that evaporates material evaporant close to the moving liquid film in the axial drum direction and with adjustable spacing of the HBE relative to the liquid film, instead of the existing art of fixed position perpendicular to the drum axis. The adjustable spacing of the evaporator is extremely important as it allows one to achieve an adjustable particle deposition path which allows one to control the size of the nanoparticles within the created nanofluid. Generally, decreasing the distance between the HBE and the moving liquid film decreases the size of the nanoparticles incorporated into the nanofluid. This improved process allows that operator control the size of the incorporated nanoparticles in nanofluids and enables one to produce nanofluids with nanoparticles in the wide size range. The invented system allows production of nanofluids with nanoparticles in the size range of about 5-10 nm or less. Previously producing nanofluids incorporating uniform nanoparticle size even in range of 10-30 nm was extremely difficult if not totally unfeasible.

Positioning the HBE in the axial direction is also important as it substantially reduces the amount of time the fluid is subjected to heat radiating and emanating from the HBE. This positioning achieves a smaller fluid-film exposure over the heated source and thus reduces fluid evaporation and its vapor-pressure and in turn the nanoparticle size, but at the same time it provides larger evaporation area and thus larger nanoparticle source evaporation and nanoparticle deposition rate.

The temperature of the liquid can also be controlled by improved liquid cooling by substantially increasing drum rotational speed, improving the design of the heat exchanger that cools the base fluid and nanofluid with liquid nitrogen flow, controlling the cooler-plate-to-drum gap with innovative roller-spacers and adding cooling fins to the cooler-plate or even to the rotating drum if needed.

Additional improvement include a liquid feed-in, inert gas purging and flashing, visual observation, and better process heating control, all of which further contribute to continuous, steady-state operation and control of temperature and pressure for production and optimization of desired nanofluid qualities and quantities.

BRIEF DESCRIPTION OF THE DRAWINGS

FIG. 1 illustrates a general nanofluid-production system-layout and additional improvements of the system;

FIG. 2 is a front view of one embodiment of the invented system;

FIG. 3 is a longitudinal cross-section of one embodiment of the system;

FIG. 4 is a longitudinal cross-section of one embodiment of the system in isometric view;

FIG. 5 is an isometric view of the heater boat-evaporator (HBE) assembly;

FIG. 6 illustrates a sectional view of one embodiment of the system incorporating an insulator and radiation shields for the HBE assembly;

FIG. 7 illustrates one embodiment of the system wherein the HBE assembly is disposed longitudinally and adjacent to a segment of the rotating cylindrical drum and thin fluid film for manufacture of nanofluids;

FIG. 8 illustrates a bottom view and cross-section of a nitrogen heat exchanger-cooler (HXC) of one embodiment of the system;

FIG. 9 illustrates an isometric view of a nitrogen heat exchanger-cooler (HXC) of one embodiment of the system; and FIG. 10 shows a rotating drum having internal disk-fins and matching disk-segment-fins on stationary HXC plate of one embodiment of the invention.

DETAILED DESCRIPTION OF THE PREFERRED EMBODIMENTS

The most preferred embodiments of the invented one-step nanofluid production system 10 are presented in FIGS. 1-10. FIGS. 1, 2 and 3, illustrates one embodiment of the invented one-step nanofluid production system 10 using a rotating drum assembly 20, nanofluid material assembly 30, a heater boat-evaporator (HBE) assembly 40, and a heat-exchanger-cooler (HXC) assembly 50 in a vacuum chamber 11 along with optional innovative accessories group 60 (61-69), is shown. On FIGS. 2, 3 and 4 the most characteristic projections, orthogonal and isometric views of the rotating drum assembly 20 with nanofluid material assembly 30, including liquid pool 31 with thin film of liquid 33 and evaporant material 35, as well as the two critical assemblies, the heater-boat-evaporator (HBE) assembly 40 and heat-exchanger-cooler (HXC) assembly 50 are presented. The HBE assembly 40 is detailed on FIGS. 5 and 6, with the preferred functional positioning presented on FIG. 7, while the HXC assembly 50 is detailed on FIGS. 8 and 9 with additional option for exceptional cooling requirements on FIG. 10.

In this system 10 in FIG. 1, and in more details on FIGS. 2, 3 and 4, a liquid 31, which is initially a base fluid such as ethylene glycol or oil, is placed in a rotating cylindrical drum 21, which is most preferably disposed in a horizontal position. As the nanofluid production process, to be described, advances, nanoparticles will be deposited onto, and subsequently incorporated into, the liquid 31 (initially base fluid) and transform it into nanofluid. The liquid 31 begins the process as a base fluid and ends up as a nanofluid.

FIG. 1 illustrates a schematic side view of one embodiment of the nanofluid production system generally comprising: a vacuum chamber 11 with two access flanges 13 and 15, a cylindrical drum 21 having an annular front-end-plate 23, a solid back-endplate 24, an inner cylindrical surface 22 (See also FIGS. 2, 3 and 4), a shaft 25 attached to the back-end plate 24, an adjustable speed motor 26 (See also FIG. 3), a heater-boat-evaporator (HBE) assembly 40, a heat exchanger-cooler (HXC) assembly 50; an electric power means for supplying power to the HBE, a liquid nitrogen means for supplying cooling to the HXC, and appropriate instrumentation and control systems (not shown).

Optionally the system can incorporate an inert gas or nitrogen purging supply means having a purge gas reservoir 61, a purge supply tubing 62, and a valve 63 for supplying purging inert gas to the vacuum chamber 11 as depicted on FIG. 1.

An optional base fluid supply means having a base fluid reservoir 64, a base fluid supply tubing 65, and a base fluid valve 66, can also be utilized for delivering a base fluid to the lower section of the drum 21. The base fluid fills at least part of the lower section of the drum 21 creating a liquid pool 31 without opening the vacuum chamber 11. Yet another option may consist of drain reservoir 67, draining tubing 68 with valve 69, to facilitate removal of produced nanofluid without opening the vacuum chamber 11, see FIG. 1.

The cylindrical drum 21 is coupled to an adjustable speed motor 26 via a sealed shaft 25 (see FIGS. 1 & 3) which rotates the drum 21 at a user selected rotational speed. As the drum 21 rotates, it drags the liquid 31 along its inside cylindrical surface 22, forming a thin film of liquid 33 on the inner surface 22 of the drum 21 above the pool of liquid 31, see FIGS. 1, 2, 3, and 7.

The cylindrical drum 21 contains annular front-end-plate 23, solid back-endplate 24 with shaft 25, and electrical motor 26. The annular front plate 23 prevents the liquid 31 from running out of the cylindrical drum 21 while at the same time allows positioning of the HBE assembly 40 and HXC assembly 50 within the rotating drum 21.

The drum has been described with an annular front plate and a solid back plate, however, a number of drum design can be envisioned and utilized as long as they allow rotation of the fluid film, prevent excess fluid from spilling out of the system, and allow adjustable positioning of the HBE and HXC assemblies within the drum as needed.

As shown in FIGS. 1 to 6, a heater-boat-evaporator (HBE) assembly 40, generally comprising: a nanoparticle-source boat-evaporator 42 with heater 41, is placed in close proximity to the upper part of the inside cylindrical surface 22 of the drum 21 above the liquid pool 31. The boat evaporator 42 and the heater 41 are oriented along the drum's central longitudinal axis and positioned in close proximity to the liquid film 33 at the top of the rotating cylindrical drum 21, see also FIG. 7.

The heater 41 is connected to a power source (not shown) so that an evaporant material 35, i.e. the nanoparticle material source, in the boat 42 is heated and the evaporant material 35, such as a metal, is evaporated at a given rate. The resulting evaporated gaseous atoms rise upwards and away from boat 42, the evaporation source, as shown in FIGS. 2, 3, 4 and 7, and after collisions form material vapor-nanoparticle mixture 37, and deposit as nanoparticles onto the surface and within the thin liquid film 33 forming a nanofluid mixture. The liquid film 33 rotates along the inside surface 22 of the rotating drum 21.

This liquid film 33, now a nanofluid, is further dragged with rotating drum 21 and mixed with the pool of liquid 31 at the bottom part of the drum 21. The liquid 31 is then cooled by the heat exchanger-cooler (HXC) assembly 50. The liquid 31 is subsequently dragged back over the HBE assembly 40, where the nanofluid production cycle is repeated continuously. The continuous deposition of nanoparticles increases their concentration in the liquid 31 until a desired concentration of nanoparticles in nanofluid is reached.

The heat exchanger-cooler assembly 50 cools the liquid 31 so that its corresponding partial pressure is low. The low pressure of the system 10 can be maintained in vacuum chamber 11 by evacuating an enclosed form of the system 10 to a desired pressure level using a vacuum pump system (not shown).

The boat evaporator 42 and heater 41 are vertically adjustable within the drum 21 as shown in FIGS. 2 to 5 in order to produce desired nanoparticle size distribution. Thus a user can adjust nanoparticle size distribution by modifying the proximity of the boat evaporator 42 to the liquid film 33, as shown in FIGS. 2 to 5.

Figure 7:
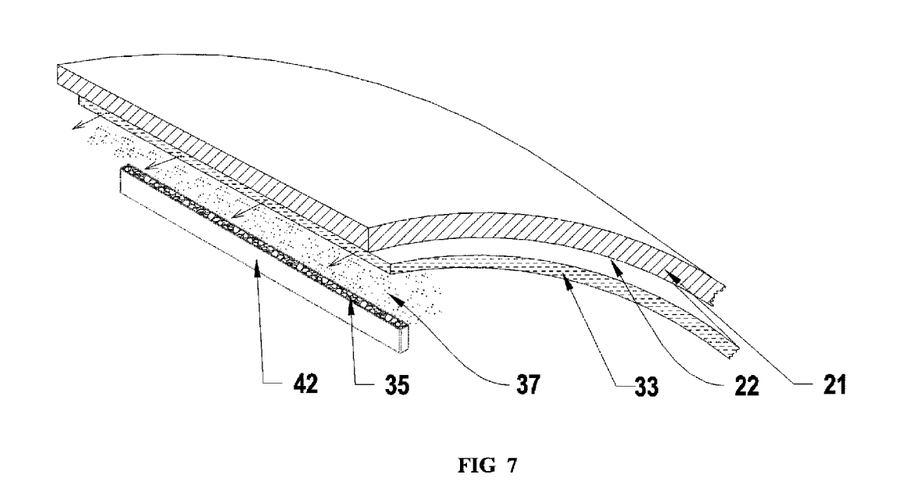

The HBE assembly 40 preferably incorporates a long, narrow boat evaporator 42 (shown in FIGS. 3-5 and 7). This prolonged and narrow boat evaporator 42 allows exposure of a wider segment of the thin liquid film 33 to enhance deposition rate of evaporated metal and nanoparticles being created and deposited to the thin liquid film 33, all this while minimizing the liquid film's 33 heat exposure over the HBE assembly 40 due to its longitudinal position with regard to the moving liquid film 33 as opposed to the central position in the existing art. As shown in FIG. 7 the long boat evaporator 42 is positioned along the longitudinal axis of the drum 21 which allows the boat 42 to cover a large surface area of the film 33, even though the boat 42 is itself narrow to minimize the moving fluid film heating and evaporation.

In preferred embodiment shown in FIGS. 1 to 4 the liquid film 33 is maintained at low pressure by evacuation of gaseous and vapor content of the vacuum chamber 11 in which the cylindrical drum 21 with liquid pool 31, nitrogen heat exchanger-cooler assembly 50, and nanoparticle source load 35 in boat 42 with heater 41 are situated.

Figure 1:
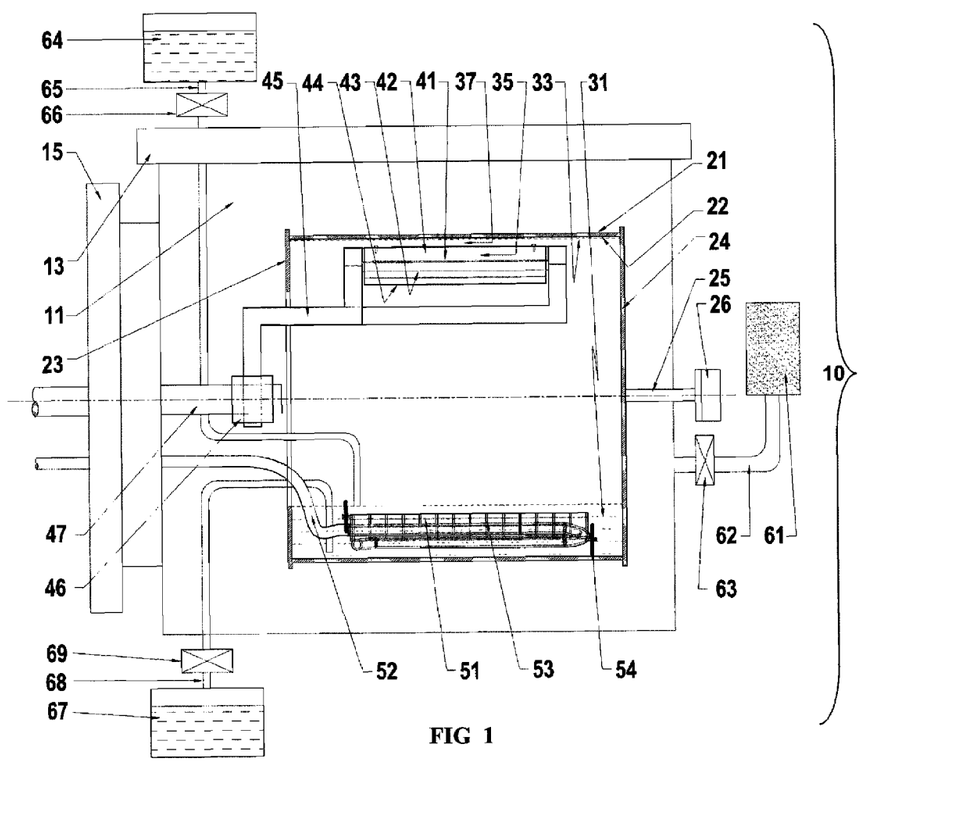
Figure 2:
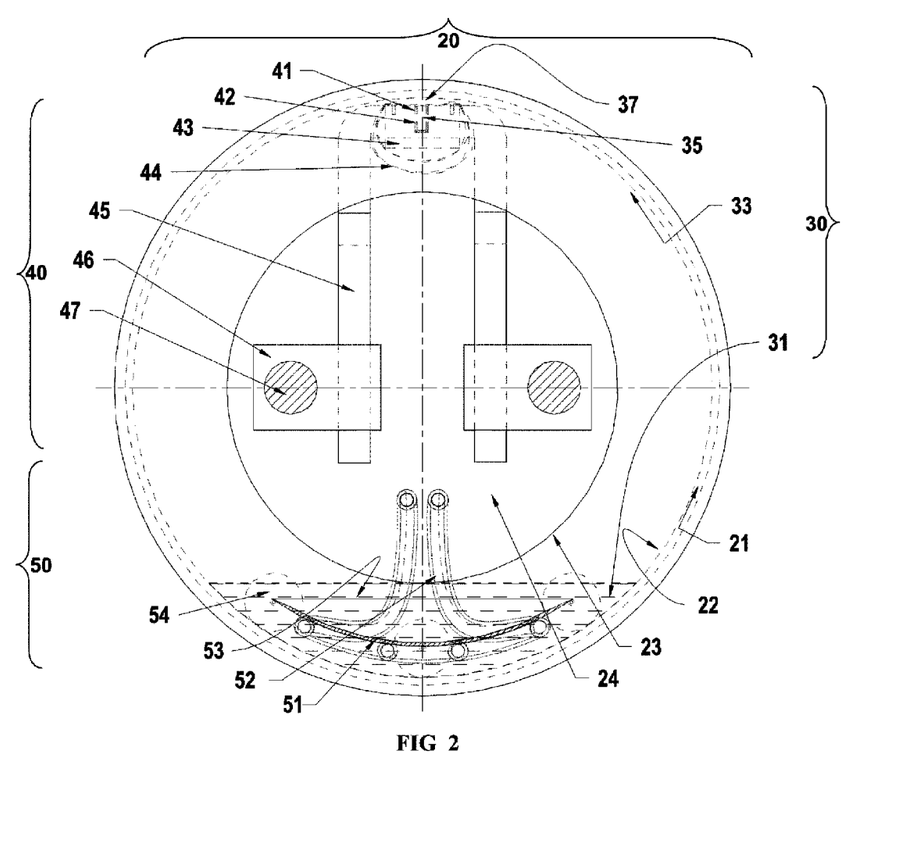

The vacuum chamber 11 may be purged and flushed with an inert gas like argon or nitrogen from a purged reservoir 61 in FIG. 1 to displace humid air and thus minimize adverse oxygen and water vapor content.

An additional embodiment of the above process may be achieved when a sufficiently low pressure (close to the triple-point pressure of fluid 31) is reached, a valve to the vacuum pump (not shown), is closed so that the closed form of system 10 with the cylindrical drum 21 is filled with the base fluid 31, and the base-fluid vapor pressure above the base fluid 31 is maintained at the saturation vapor pressure corresponding to the fluid temperature.

Vacuum Chamber

The vacuum chamber 11, see FIG. 1, is covered and sealed with two flanges 13 and 15 and connected with a two stage vacuum pump system (not shown) capable of establishing and maintaining extremely low chamber pressure in fractions of millitorr range (1 millitorr=0.1333225 Pascal) The system vacuum is established by opening the vacuum system valve (not shown) and running the first and the second stage of commercially available vacuum pumps until a desired vacuum level is achieved. After a desired vacuum level is achieved the vacuum system valve is closed and the vacuum pumps are additionally turned on only if and when needed to compensate for eventual leaks or if different vacuum level is desired. The system vacuum is also maintained by controlling the corresponding fluid saturation temperature as explained elsewhere.

It should be noted that the various tubes, instrumentation wiring and other components that enter or exit the vacuum chamber can be sealed using various sealing means known in the art, as to maintain the vacuum during operation.

Cylindrical Drum Assembly

Figure 3:
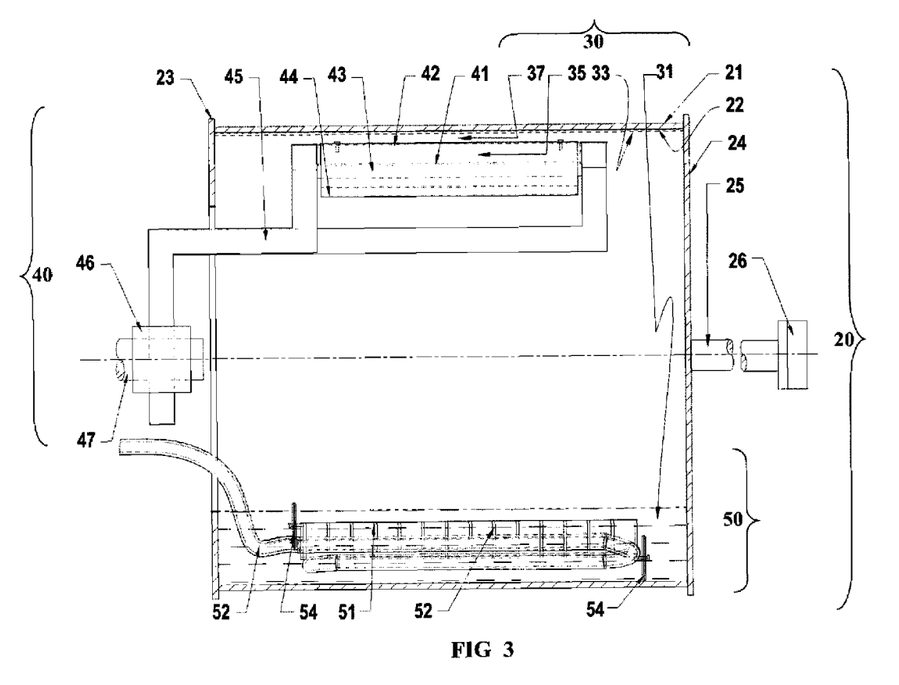
Figure 4:
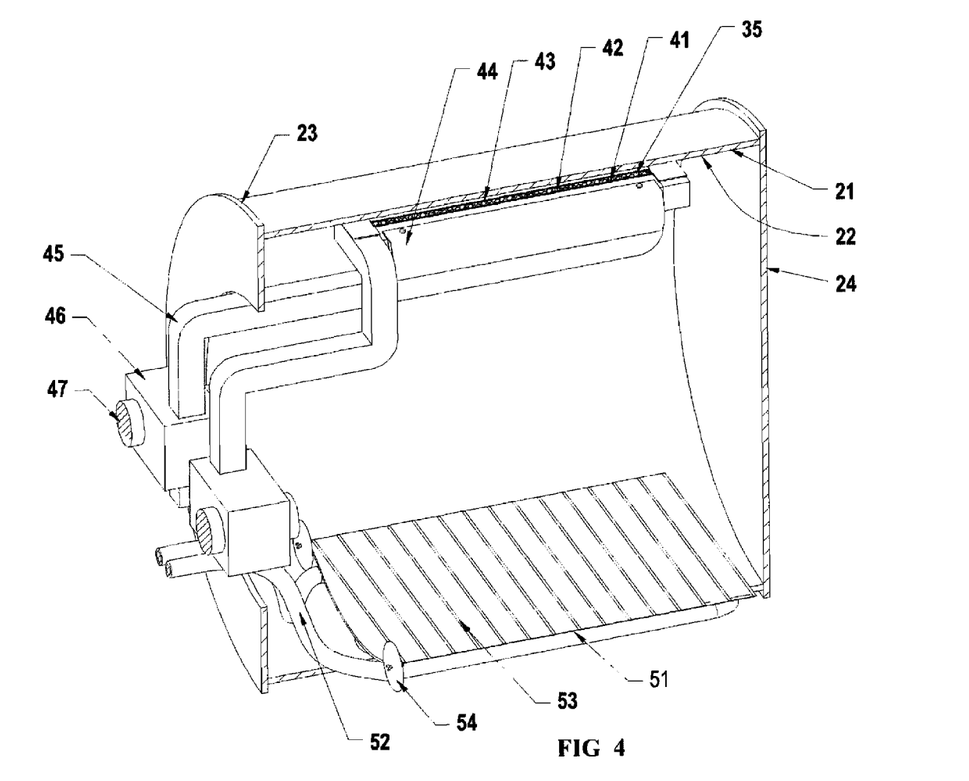
Figure 5:
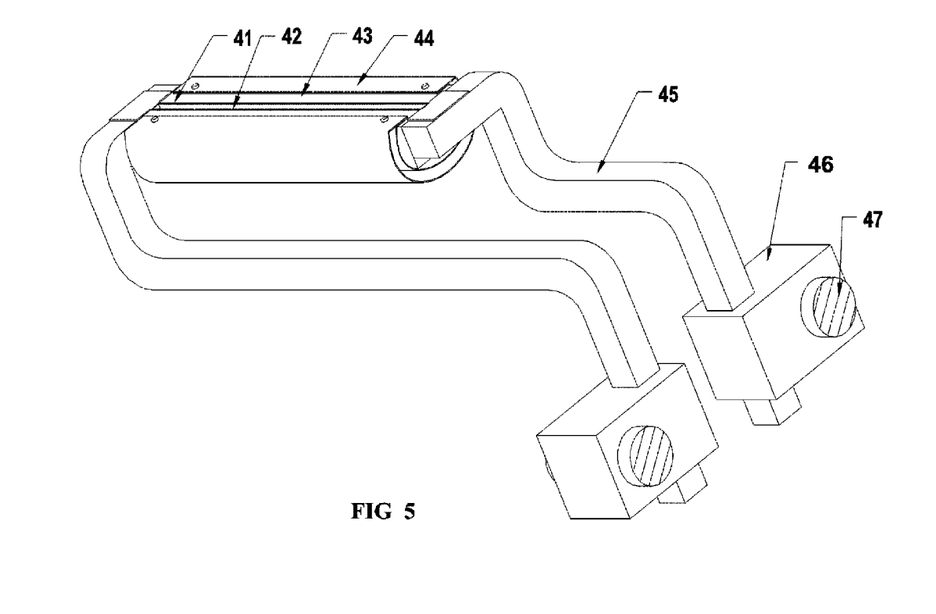

The cylindrical drum assembly 20 consists of a cylindrical drum 21 with an inner cylindrical surface 22, an annular front-end plate 23 and a back-end plate 24. In FIGS. 1 and 3, the shaft 25 is attached to the back-end plate 24, however, the shaft 25 could be attached to the drum in a variety of other arrangements.

The motor 26 drives the shaft 25 which in turn rotates the drum 21 causing the liquid 31 to be dragged along the inside of the cylindrical surface 22 of the drum 21. At a desired rotational speed a thin film of liquid 33 is formed along the circumference of the inner surface 22 of the drum 21.

It should be noted that the drum 21 could be supported and rotated in a number of other ways known in the art including but not limited to the use of rollers (not shown) or other rotational means. The drum 21 rotation speed could be adjusted, preferably from several to hundreds of revolutions per minute (RPM), by using a commercially available variable-speed motor (from a number of different motors known in the art).

Heater-Boat-Evaporator (HBE) Assembly

Figure 6:
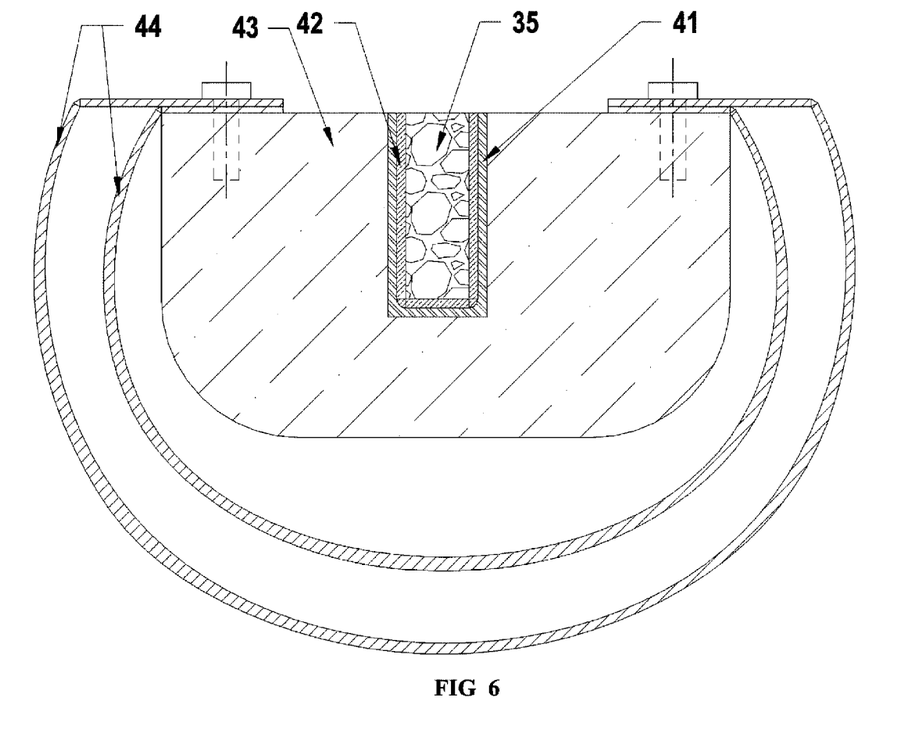

In one embodiment the heater-boat evaporator (HBE) assembly 40 comprises: a heater element 41, a boat evaporator 42, and a nanoparticle source or evaporant material 35. FIG. 6 illustrates a cross-section of one preferred embodiment of the HBE assembly. The boat evaporator 42 is located above and in thermal (and preferably physical) contact with the heater element 41. The heater element 41 heats the boat evaporator 42, which in turns heats the evaporant material 35 until the evaporant (nanoparticle source, like copper or other metal) 35 begins and continue to evaporate.

The HBE assembly 40 is oriented along the central longitudinal axis of the cylindrical drum 21 and the boat evaporator 42 is positioned in close proximity to the thin liquid film 33 at the top section of the cylindrical drum 21 as shown in FIG. 7

As mentioned earlier, the distance from the evaporator boat 42 to the liquid film 33 is critical, as it is a crucial parameter in determining the size distribution of the nanoparticles incorporated in the nanofluid, the preferable distance being in range of about 5-55 mm. The HBE assembly 40 is preferably positioned so that the evaporator boat 42 is in close proximity below and faces the moving liquid film 33 so that when the evaporant material 35 evaporates towards the liquid film 33 and thus forms material vapor-nanoparticle mixture 37 that readily incorporates into the liquid film 33 above.

The heater element 41 can be selected from a number of heaters known in the art. Preferably the heater element 41 is constructed of a high temperature electrical conductor, more preferably molybdenum or titanium.

The evaporator boat 42 can be made of a number of materials including but not limited to ceramics and other dialectic materials having high melting temperatures.

HBE Insulation and Shielding

As shown in FIG. 6 it is advantageous to insulate the heater 41 using an insulation medium 43 to minimize heat losses, (i.e. heat flow to the base liquid 31 and fluid film 33), thereby stabilizing the system for well controlled and continuous (i.e. steady-state) nanofluid production. The insulation medium 43 can include various well known materials including ceramic and high-temperature foam insulation.

Preferably the heater 41 is surrounded by the insulation on three sides, the fourth side of the heater preferably being in contact with the boat evaporator 42 as shown in FIG. 6. The insulation can be connected to the heater using a variety means known in the art including but not limited to physical and chemical attachment means.

Preferably the insulation is covered with a radiation shield material 44 (i.e. shiny metal foil) to minimize radiation heat loss. Since the system is maintained in a vacuum, the majority of heat transfer is a result of thermal radiation. Therefore, the radiation shielding 44 minimize the transfer of heat from the heater 41 to the liquid 31 and the liquid film 33, thus supplying most of the heating power to the boat evaporator 42 and in turn to nanoparticle source material 35 to enhance the nanoparticle source evaporation rate. A number of radiation shielding layers can be employed, preferably two or more. Preferably the radiation shielding material is a polished stainless steel or similar high-temperature foil. It is important to maintain a small gap between the radiation shielding and the insulation to prevent conduction heat transfer losses. Screws or other fasteners can be used to keep the shielding in place.

Support Means for the HBE Assembly

The adjustable HBE assembly 40 includes the support means as a salient part of at least one embodiment of the invention because it allows one to adjust proximity between boat evaporator 42 and moving fluid film 33, and thus control the evaporation rate and distribution size of the nanoparticles 37 incorporated first into the nanofluid film 33 and then the liquid pool 31.

FIGS. 2 to 5 illustrate one embodiment of the HBE support means (HBE-SM). In the illustrated embodiment the HBE-SM generally comprises two main rod-conductors 47, two adjusting guide couplers or connectors 46 and two adjusting rod-conductors 47. The main rod-conductors 47 are anchored to the side flange 15 of the chamber 11 (see FIG. 1).

The adjusting guide coupler 46 connects the main rod-conductors 47 to the adjusting rod-conductors 45 as shown in the FIGS. 2 to 5. The rod-conductors can be attached to the HBE assembly in a variety of physical and chemical connection means known in the art. A suitable connecting means is by standard threaded fasteners.

The adjusting rod-conductors 45 are preferably connected to the adjusting guide couplers 46 so that the rod-conductors 45 can be adjusted in vertical direction in a preferable vertical position to control the distance between HBE assembly 40 and liquid film 33. The main rod-conductors 47 are wired to a DC power source (not shown).

In one embodiment the guide coupler(s) 46 has(have) a central aperture, the adjusting rod-conductors 45 are running through the central aperture, wherein the central aperture snugly fits the rod-conductors in its central aperture thereby being supported by the main rod-conductors 47.

A variety of other adjustable support means for the HBE assembly 40 can be envisioned as long as they support the HBE and allow one to adjust the distance between the HBE assembly 40, more specifically the boat evaporator 42 and the liquid film 33.

The Evaporant Material (Nanoparticle Source)

The evaporant material 35 can be any material capable of being evaporated to form desired type of nanoparticles. Preferably the evaporant 35 is a metal, metal oxide, an alloy or other compound, more preferably the evaporant is a metal like copper, silver or similar material.

Heat Exchanger-Cooler Assembly

The heat exchanger-cooler (HXC) assembly 50 is positioned within the lower section of the cylindrical drum 21, and is preferably located within the liquid pool 31. The heat exchanger-cooler assembly 50 cools the liquid 31 before it is dragged in form of thin liquid film 33 over the HBE assembly 40 again, allowing for a continuous nanofluid production cycle. The HXC assembly 50 effectively cools the liquid 31 and balances any increases in temperature due to HBE heating and other heat gains. The HXC assembly 50 has very important function because it keeps the liquid 31 and liquid film 33 cool thus minimizing evaporation of the liquid.

The HXC assembly 50 is preferably designed to use liquid nitrogen as a cooling source. The improved heat exchanger-cooler assembly 50 is a salient part of at least one embodiment of the invention because it allows sufficient cooling of the liquid 31, minimizing evaporation of the liquid and allowing continuous production of nanofluids.

Figure 8:
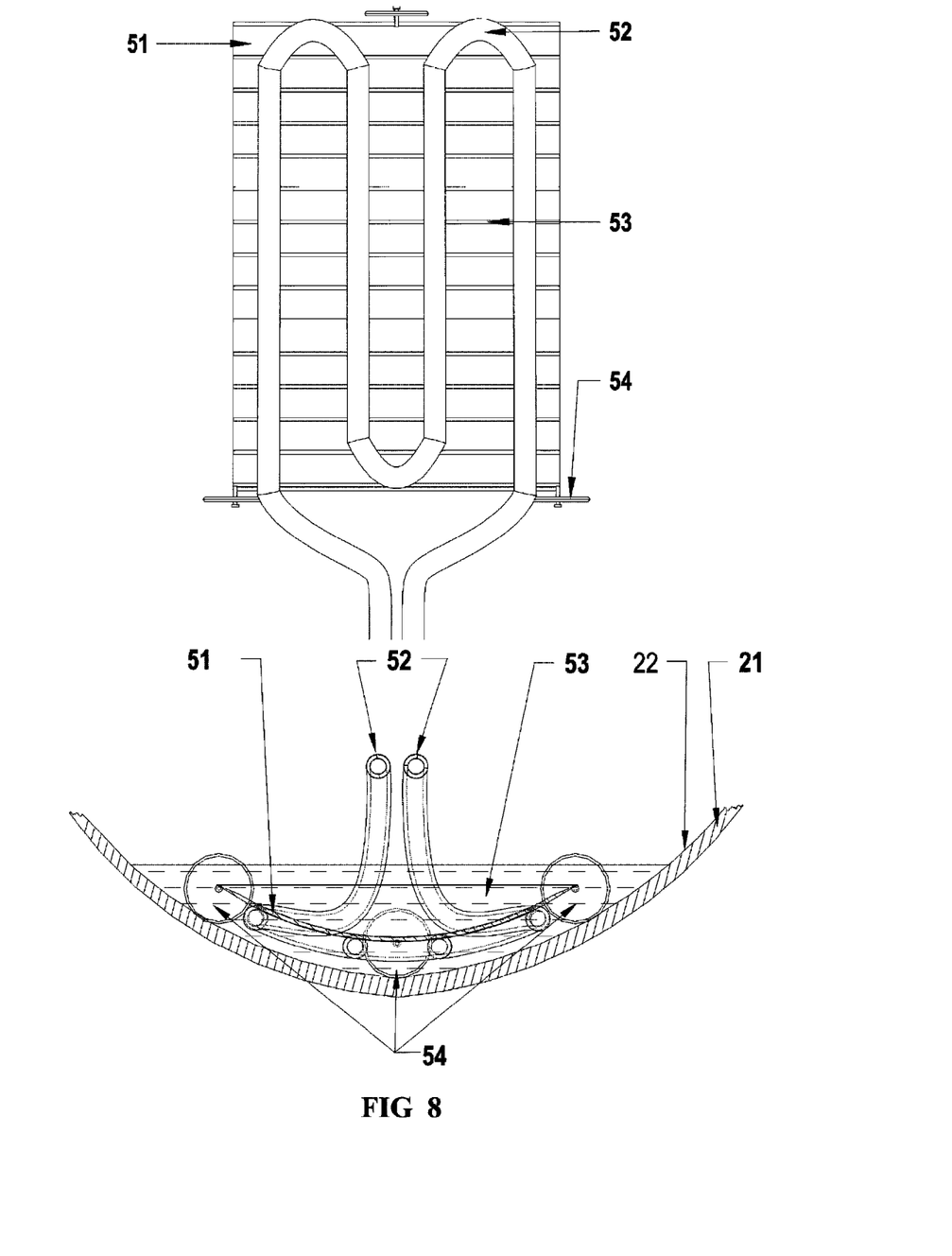
Figure 9:
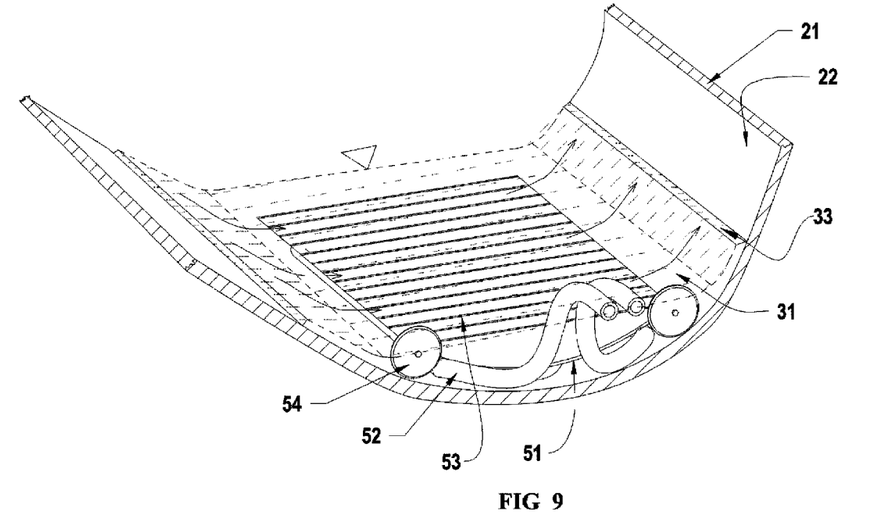
Figure 10:
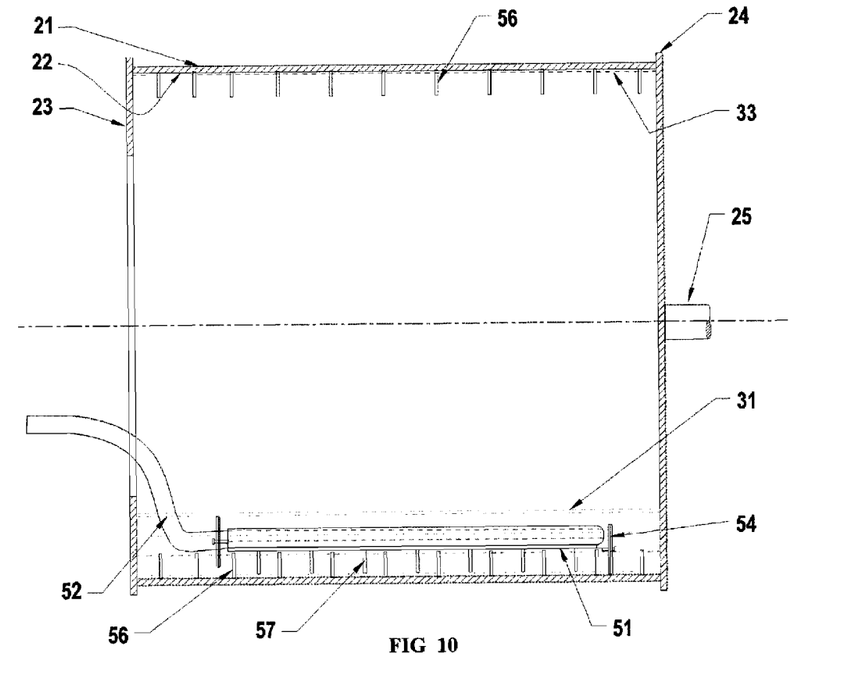

FIGS. 8 to 10 illustrate a preferred novel heat exchanger-cooler assembly 50 generally comprising: a cooler-plate 51 incorporating cooling tubing (coil) 52, and optional cooling fins 53, as illustrated in see FIGS. 8 and 9. The cooling plate 51 is cooled by a cooling coil 52 (preferably in very good physical and thermal contact with the cooling plate 51) which is positioned within the lower part of rotating drum 21.

The coils (cooling tubing) 52 are cooled by a coolant, preferably liquid nitrogen that flows through the coils. The coolant can be selected from a number of coolants known in the art, is preferably liquid nitrogen.

The cooled coil 52 removes heat from the cooling plate 51 which in turn cools (removes heat from) the liquid 31, removing any heat gained by the liquid 31 as it passes through the system. Liquid nitrogen is preferably discharged continuously from a commercial storage cylinder (not shown) or other liquid nitrogen source, through the coils 52, The inlet of coil 52 can be attached to a nitrogen source via an insulated inlet tube (not shown) and discharged via an outlet tube (not shown). Preferably the used nitrogen exiting the outlet tube is recycled. Optionally, a temperature sensor, preferably a thermocouple (not shown) is imbedded in the liquid pool 31, and nitrogen flow through the cooling coil is controlled via adjustable valve (not shown) to maintain a desired liquid temperature and in turn to maintain desired system pressure. The length of each cooler fin 53 is designed to allow recirculation flow within liquid pool 31. The fins 53 are spaced along the length of the cooling plate 51 as shown in FIGS. 8 and 9. The number of fins 53 and their width and spacing can be adjusted for optimum cooling. The fins 53 serve as a heat sink extended surfaces and help efficiently remove and disperse the heat absorbed by the cooling plate 51.

The heat exchanger preferably has a number of rollers 54 of different sizes which provide an optimal gap between the cooling plate 51 and the inside of the drum surface 22. The gap of about 5-15 mm is preferable to achieve the most favorable cooling of liquid 31.

An alternate improved innovative heat exchanger-cooler assembly 50 for application with extreme cooling requirements is presented on FIG. 10. To increase flow and thus cooling of liquid 31 over the innovative disk-segment-form fins 57 attached to the cooling plate 51, and thus substantially increase the cooling of liquid 31, special disk fins 56 are attached to the inside cylindrical surface 22 of the rotating drum 21. This innovative design with rotating fins 56 substantially increases the dragging of the liquid pool 31 and thus commensurate increase of convective heat transfer over the stationary fins 57 attached to cooler plate 51.

Base Liquids

The base liquids can be a variety of liquids, however, low vapor pressure liquid are preferred because liquids with lower vapor pressures are less likely to be evaporated by the HBE assembly, however, a variety of liquids can be employed.

Suitable base liquids included but are not limited to: oils, tri-ethylene glycol, ethylene glycol and other industrial fluids. Vacuum oils and different ethylene glycol mixtures being preferred base liquids.

Power Supply

A commercial DC electrical power supply (not shown) of low voltage (preferably less than about 20 V) and high current (preferably up to about 200 A) is attached via electrical conductors (not shown), the main-rod conductors 47, guide-couplers 46 and adjusting rod-connectors 45, to the heater element 41 of the HBE assembly 40.

Standard line AC electrical supply is used to power electrical motor 26 for rotation of drum 21, as well as to power the vacuum pump drives/motors, related instrumentation and accessories (not shown)

Determining Nanoparticle Size Distribution and Concentration

Nanoparticle size distribution and concentration of the produced nanofluids are determined using different laboratory methods known to art. The measured nanoparticle size distribution and concentration as function of the production process parameters, such as (1) vacuum system and chamber pressures, (2) drum rotation speed, (3) boat evaporator temperature, (4) cooling liquid temperature, (4) boat evaporator to liquid film separation distance, and (5) nanoparticle deposition time, will be used to calibrate the required process parameters of the one-step nanofluid production apparatus. The calibration results will be used for desired control of those production process-parameters during manufacture of nanofluids of desired quality, nanoparticle size distribution and concentration in nanofluid.

Alternate Embodiments

A variety of additional steps can also be taken to effectuate improved thermal control of the system 10 (see FIG. 1), including without limitation: adjusting the rate of rotation of the cylindrical drum 21 to control desired properties of the nanofluid 31, such as: increasing rotation of the drum 21 to higher rotational speeds up to several hundreds revolution per minute to minimize exposure of the liquid film 33 and thus minimize its heating and evaporation which in turn decreases vapor pressure and nanoparticle size distribution and increases nanofluid production rate; and improved nitrogen cooler heat exchanger design, among others. The boat heater 41 can be controlled by an embedded temperature sensor, preferably a thermocouple, and an automated feedback-controlled system (not shown).

Furthermore, purging the system 10 with an inert gas, like argon or nitrogen gas before starting any nanofluid production to minimize oxygen and water vapor contents remained from air and also after a manufacturing cycle to prevent any ambient air leaks into the system.

In yet a further preferred embodiment shown in the annular front-end-plate 23, is made of two halves (not shown) to be attached with fasteners and sealed to the drum 21. This design allows for smaller annular opening facilitated with detachable two halves of the annular front-end-plate 23. This will accommodate placement of a larger form of the HBE assembly 40 and the HXC assembly 50 into the rotating drum assembly 20 and drum 21 and thus provide for a larger quantity of the liquid 31 thus resulting in faster nanofluid production rate.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations therefore, is not intended to limit the claimed processes to any order except as may be specified in the claims. All ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like refer to ranges which can be subsequently broken down into sub-ranges as discussed above. Accordingly, the invention is limited only by the following claims and equivalents thereto.

All publications and patent documents cited in this application are incorporated by reference in their entirety for all purposes to the same extent as if each individual publication or patent document were so individually denoted.

The invention claimed is:

1. A method for producing nanofluids comprising:
providing a cylindrical drum having an upper section, a lower section and a cylindrical inner surface;
filling a portion of the lower section of the drum with a base liquid forming a base liquid pool;
providing an evaporant material as a source of nanoparticles;
rotating the cylindrical drum at a speed equal to or exceeding the speed required to drag a portion of the liquid in the liquid pool along the circumference of the inner cylindrical surface of the drum creating a rotating liquid film along the inner surface of the drum;

positioning the evaporant material in proximity to a portion of the rotating liquid film and heating the evaporant to a temperature sufficient to cause a portion of the evaporant material to evaporate and form nanoparticles, the nanoparticles being incorporated into the rotating liquid film forming a nanofluid; and cooling the formed nanofluid.

2. The method of claim 1, wherein the evaporant being heated is positioned in proximity to the inner surface of the upper section of the cylindrical drum and is oriented along the central longitudinal axis of the drum.

3. The method of claim 2, further comprising controlling the average size of the nanoparticles incorporated in the rotating liquid film by adjusting the position of the evaporant being heated relative to the rotating liquid film.

4. The method of claim 3, wherein there is a distance between the evaporant and the rotating liquid film and wherein decreasing the distance between the evaporant and the rotating liquid film decreases the average size of the nanoparticles incorporated into the rotating liquid film and wherein increasing the distance between the evaporant and the rotating liquid film increases the average size of the nanoparticles incorporated into the rotating liquid film fluid.

5. The method of claim 3, wherein the average size of the nanoparticles in the nanofluid is between about 5-50 nanometers.

6. The method of claim 3, wherein the average size of the nanoparticle in the nanofluid is about 5 nanometers.

7. The method of claim 3, wherein the nanofluid is produced under a vacuum.

8. The method of claim 3, wherein nanofluid is produced under low pressure.

9. The method of claim 3, wherein the vapor pressure above the base liquid is maintained at the saturation vapor pressure corresponding to fluid temperature during production.

10. The method of claim 1, wherein the average size of the nanoparticles in the nanofluid is between about 5-50 nanometers.

11. The method of claim 1, wherein the average size of the nanoparticles in the nanofluid is about 5 nanometers.

12. The method of claim 1, wherein the nanofluid is formed under a vacuum.

13. The method of claim 1, wherein nanofluid is formed under low pressure.

14. The method of claim 1, wherein the vapor pressure above the base liquid is maintained at the saturation vapor pressure corresponding to fluid temperature during production.

15. The method of claim 1, wherein the evaporant is a metal, metal oxide, alloy or combinations thereof.

16. The method of claim 1, controlling the temperature of rotating liquid film to prevent evaporation of the liquid.

17. The method of claim 16, wherein the temperature of the rotating liquid film is controlled using a heat exchanger positioned within the liquid pool.

* * * * *